(12) United States Patent
Ignatovich et al.

(10) Patent No.: US 8,279,446 B2
(45) Date of Patent: Oct. 2, 2012

(54) FIBER-BASED INTERFEROMETRIC DEVICE FOR MEASURING AXIAL DIMENSIONS OF A HUMAN EYE

(75) Inventors: Filipp V Ignatovich, Rochester, NY (US); Todd Blalock, Penfield, NY (US)

(73) Assignee: Lumetrics, Inc., Rochester, NY (US)

( * ) Notice: Subject to any disclaimer, the term of this patent is extended or adjusted under 35 U.S.C. 154(b) by 0 days.

(21) Appl. No.: 13/185,554

(22) Filed: Jul. 19, 2011

(65) Prior Publication Data
US 2012/0013913 A1    Jan. 19, 2012

Related U.S. Application Data

(60) Provisional application No. 61/365,594, filed on Jul. 19, 2010.

(51) Int. Cl.
*G01B 9/02* (2006.01)
(52) U.S. Cl. .......................... 356/479; 356/491
(58) Field of Classification Search .................. 356/477, 356/479, 485, 487, 491, 492, 495; 351/206
See application file for complete search history.

(56) References Cited

U.S. PATENT DOCUMENTS

| | | | |
|---|---|---|---|
| 4,681,445 A | 7/1987 | Perkins | |
| 5,347,328 A | 9/1994 | Sekine et al. | |
| 5,596,409 A | 1/1997 | Marcus et al. | |
| 5,975,697 A | 11/1999 | Podoleanu et al. | |
| 6,201,608 B1 | 3/2001 | Mandella et al. | |
| 6,243,191 B1 | 6/2001 | Fercher | |
| 6,307,634 B2 | 10/2001 | Hitzenberger et al. | |
| 6,421,164 B2 | 7/2002 | Tearney et al. | |
| 6,735,463 B2 | 5/2004 | Izatt et al. | |
| 7,006,232 B2 | 2/2006 | Rollins et al. | |
| 7,190,464 B2 | 3/2007 | Alphonse | |
| 7,242,480 B2 | 7/2007 | Alphonse | |
| 7,364,296 B2 * | 4/2008 | Miller et al. | ................. 351/206 |
| 7,372,578 B2 | 5/2008 | Akiba et al. | |
| 7,382,962 B1 | 6/2008 | Yao | |
| 7,408,648 B2 | 8/2008 | Kleen et al. | |

(Continued)

OTHER PUBLICATIONS

Stenstrom, Solve, "Investigation of the Variation and the Correlation of the Optical Elements of Human Eyes" American Journal of Optometry and Archives of American Academy of Optometry, Columbia University Optometry Laboratory, New York, New York, Jul. 1948, vol. 25., No. 7, pp. 341-351, file name 20120626_13-185554_IDS_NPL_cite1.

(Continued)

*Primary Examiner* — Michael A Lyons
(74) *Attorney, Agent, or Firm* — Patent Innovations LLC; John M. Hammond

(57) ABSTRACT

An apparatus for measuring a layered object comprising a low coherence light source, a coherent light source, and an interferometer including a reference arm and a measurement arm. The reference arm is comprised of a first section of polarization maintaining optical fiber engaged with a first fiber stretcher. The measurement arm is comprised of a second section of polarization maintaining optical fiber engaged with a second fiber stretcher. The first and second fiber stretchers are driven so as to alternatingly vary the lengths of the first section of polarization maintaining optical fiber and the second section of polarization maintaining optical fiber, thereby causing interference signals with the low coherence light when the length of the reference arm is equal to the length of the measurement arm including the distance from the second section of polarization maintaining optical fiber to any of the surfaces of the layers of the object.

19 Claims, 3 Drawing Sheets

U.S. PATENT DOCUMENTS

| | | |
|---|---|---|
| 7,428,086 B2 | 9/2008 | Dufour et al. |
| 7,434,932 B2 | 10/2008 | Hanebuchi |
| 7,488,930 B2 | 2/2009 | Ajgaonkar et al. |
| 7,602,500 B2 * | 10/2009 | Izatt et al. ............ 356/497 |
| 7,884,946 B2 * | 2/2011 | Blalock et al. ........... 356/497 |
| 2001/0051013 A1 | 12/2001 | Frederick et al. |
| 2005/0004453 A1 | 1/2005 | Tearney et al. |
| 2005/0140981 A1 | 6/2005 | Waelti |
| 2005/0213103 A1 | 9/2005 | Everett et al. |
| 2006/0055939 A1 | 3/2006 | Akiba et al. |
| 2006/0100490 A1 | 5/2006 | Wang et al. |
| 2006/0109477 A1 | 5/2006 | Zhou et al. |
| 2007/0076217 A1 | 4/2007 | Baker et al. |
| 2007/0236700 A1 | 10/2007 | Yun et al. |
| 2008/0065710 A1 | 3/2008 | Fiorentino et al. |
| 2008/0094613 A1 | 4/2008 | De Boer et al. |
| 2008/0180683 A1 | 7/2008 | Kemp |
| 2008/0246918 A1 | 10/2008 | Zhou et al. |
| 2008/0267562 A1 | 10/2008 | Wang et al. |
| 2008/0285043 A1 | 11/2008 | Fercher et al. |
| 2009/0207418 A1 | 8/2009 | Kim et al. |

OTHER PUBLICATIONS

Office Action of Jul. 19, 2010 of U.S. Appl. No. 12/150,486, now U.S. Patent No. 7,884,946, file name 20120626_13-185554_IDS_NPL—cite2.

* cited by examiner

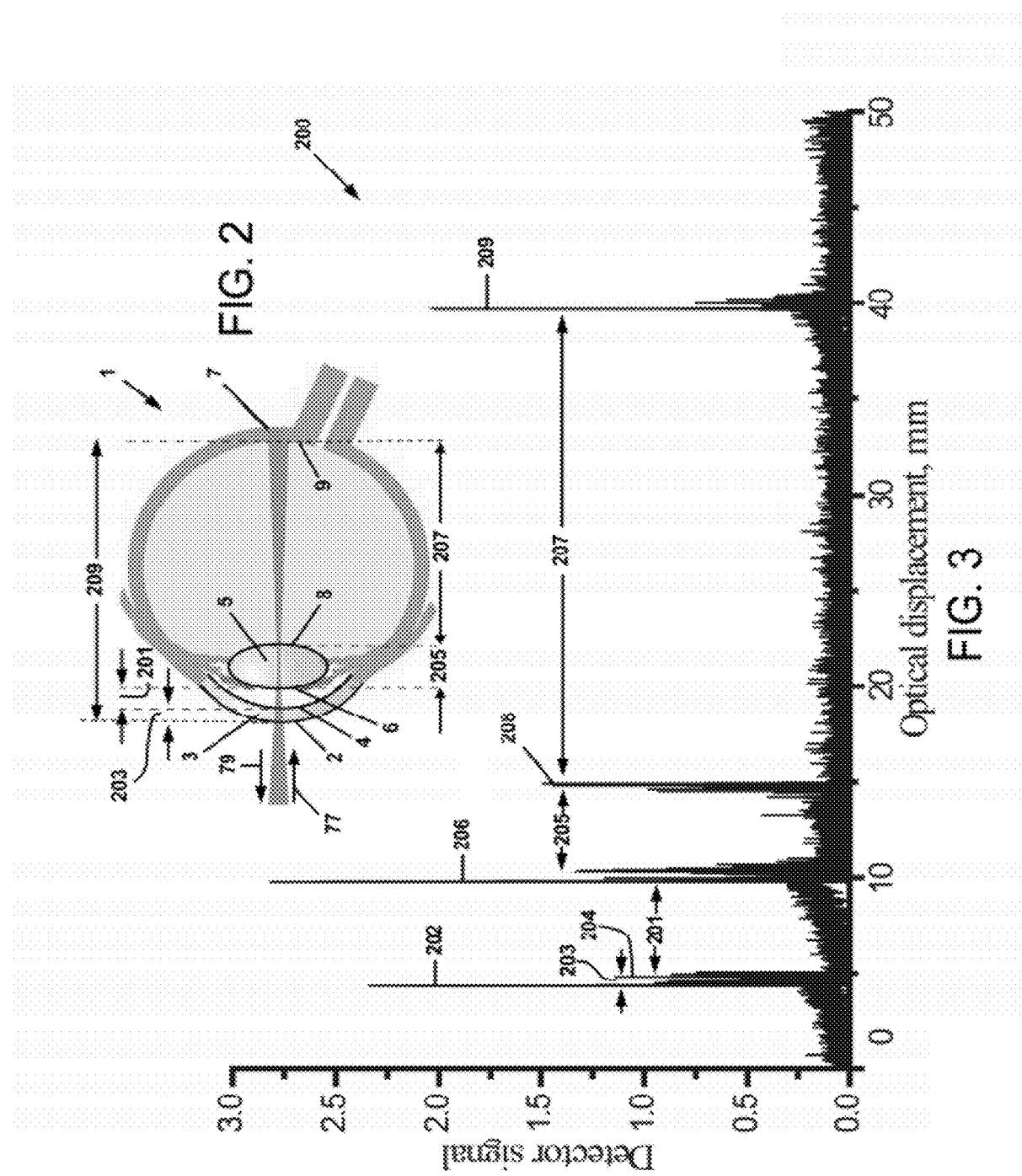

FIBER-BASED INTERFEROMETRIC DEVICE FOR MEASURING AXIAL DIMENSIONS OF A HUMAN EYE

CROSS-REFERENCE TO RELATED PATENT APPLICATIONS

This application claims priority from U.S. provisional patent Application No. 61/365,594 filed Jun. 19, 2010, the disclosure of which is incorporated herein by reference. This application is also related to commonly owned patent application Ser. No. 12/150,486 filed on Apr. 28, 2008, and issued as U.S. Pat. No. 7,884,946, the disclosure of which is incorporated herein by reference.

STATEMENT REGARDING FEDERALLY SPONSORED RESEARCH OR DEVELOPMENT

This invention was made with United States Government support. The U.S. Government has a paid-up license in this invention and the right under limited circumstances to require the patent owner to license others on reasonable terms as provided for by the terms of contract number 0923963 awarded by the National Science Foundation.

BACKGROUND

1. Field of the Invention

Apparatus for measuring the axial length of the human eye or another layered object, and more particularly, interferometric apparatus for measuring the axial length of the human eye with high precision and high speed.

2. Description of Related Art

The United States population of people over 65 years old is expected to exceed 70 million in 2030. World populations of the elderly are increasing at a similar rate. Accordingly, there is a significant and growing need for tools to treat the high incidence of eye diseases and related problems that are expected within that demographic. Cases of diabetic retinopathy, glaucoma, macular degeneration, and cataract disease will likely climb tremendously in the next few decades. Information about the structure of the eye is required in surgeries for these diseases, and in surgeries that deal with replacement of the crystalline lens of the eye. Choosing a correct intraocular lens (IOL) is a crucial step in this procedure.

The choice of an optically correct intraocular lens requires detailed knowledge of the precise geometry of the particular eye. This in turn requires an apparatus and method for precise and accurate measurement of eye geometry. One technique that can be used to measure a layered structure is long-range time-domain low-coherence interferometry (TD-LCI). TD-LCI is used in many fields such as microscopy, sensing applications, and quality control in semiconductor manufacturing and other industries.

The eye is a layered structure. However, heretofore the use of TD-LCI in the measurement of the distances between optical interfaces inside a human eye has been limited due to its slow measurement speed, low range and low sensitivity. In attempting to measure the geometry of an eye using TD-LCI, measurement speed defines the accuracy of the method since the measurements are performed on a live patient's eye, which is subject to a small jitter. Additionally, high measurement sensitivity is required to detect weak scattering from the tissue-liquid interfaces within the eye.

Currently, a majority of the ophthalmologists use less precise ultrasound and other instruments for eye measurement, but are interested in obtaining improved eye measurement tools. There are over 20,000 hospitals, ambulatory surgical centers, and offices used by the more than 16,000 ophthalmologists and 32,000 optometrists within the United States that could use such improved tools, and many more locations worldwide.

What is needed, therefore, is a measurement apparatus that has a sufficiently high measurement speed so as to perform a complete measurement of the geometry of an eye faster than the occurrence of eye jitter, while also having sufficient sensitivity to detect the tissue-liquid eye interfaces, and sufficient range so as to be able to measure all of the interfaces of the eye, from the outer corneal surface to the retinal surface.

SUMMARY

In accordance with the present disclosure, an apparatus for measuring a layered object, such as an eye, that meets this need is provided, comprising a low coherence light source, a coherent light source, and an interferometer including a reference arm and a measurement arm. The reference arm is comprised of a first section of polarization maintaining optical fiber engaged with a first fiber stretcher and terminating proximate to a first mirror. The measurement arm is comprised of a second section of polarization maintaining optical fiber engaged with a second fiber stretcher and terminating at a first port of a first polarization selective light splitter and combiner configured to direct light of a first polarization through a second port to the layered object, and to direct light of a second polarization through a third port to a second mirror. The low coherence light source emits low coherence light through a first polarization controller, into a first port and out of a second port of a second polarization selective light splitter and combiner, through a polarization maintaining fiber coupler and into the first and second sections of polarization maintaining optical fiber. The coherent light source emits coherent light through a second polarization controller, into a third port and out of the second port of the second polarization selective light splitter and combiner, through the polarization maintaining fiber coupler and into the first and second sections of polarization maintaining optical fiber.

The first polarization controller polarizes the low coherence light with the first polarization, and the second polarization controller polarizes the coherent light with the second polarization, which is substantially orthogonal to the first polarization. The low coherence light of the first polarization and the coherent light of the second polarization co-propagate through the reference arm of the interferometer and are reflected by the first mirror through the reference arm back to the polarization maintaining fiber coupler. The low coherence light of the first polarization and the coherent light of the second polarization co-propagate through the measurement arm of the interferometer, the coherent light of the second polarization is split from the low coherence light of the first polarization and reflects off the second mirror through the measurement arm back to the polarization maintaining fiber coupler, and the low coherence light of the first polarization is reflectable off the layered object through the measurement arm back to the polarization maintaining fiber coupler. Back reflected low coherence light of the first polarization is propagated from the polarization maintaining fiber coupler to a first detector, and reflected coherent light of the second polarization is propagated from the polarization maintaining fiber coupler to a second detector.

The first and second fiber stretchers are driven so as to alternatingly vary the lengths of the first section of polarization maintaining optical fiber and the second section of polarization maintaining optical fiber, thereby causing interference signals with the low coherence light when the length of the reference arm is equal to the length of the measurement arm including the distance from the second section of polarization maintaining optical fiber to any of the surfaces of the layers of the object. The interference signals are detected by the first detector. Additionally, a signal from the back reflected coherent light of the second polarization that is indicative of the length of the measurement arm including the distance from the second section of polarization maintaining optical fiber to at least one surface of the layered object is also detected.

The apparatus may further include an optical probe in optical communication with the third port of the first polarization selective light splitter and combiner. The apparatus may further include a third section of polarization maintaining optical fiber disposed between the polarization maintaining fiber coupler and the first detector, so that the back reflected low coherence light of the first polarization and back reflected coherent light of the second polarization may be propagated therethrough. An in-line polarizer may be disposed between the third section of polarization maintaining optical fiber and the first detector, which blocks back reflected coherent light of the second polarization from entering the first detector.

The apparatus may be further comprised of a first optical coupler disposed between the low coherence light source and the first polarization controller, and a second optical coupler disposed between the coherent light source and the second polarization controller. In such an instance, back reflected low coherence light of the first polarization passes into the second port and out of the first port of the second polarization selective light splitter and combiner, and through the first optical coupler to the first detector; and back reflected coherent light of the second polarization passes into the second port and out of the third port of the second polarization selective light splitter and combiner, and through the second optical coupler to the second detector. The first optical coupler may be an optical circulator.

The low coherence light source may be a super luminescent light emitting diode. The coherent light source may be a laser. The wavelength of the laser may be substantially equal to the central wavelength of the super luminescent light emitting diode. These wavelengths may be about 830 nanometers.

In operation of the apparatus, the first fiber stretcher may be operated substantially 180 degrees out of phase with the second fiber stretcher. The first and second fiber stretchers may be piezoelectrically driven fiber stretchers. The apparatus may further include a computer in signal communication with the first and second detectors.

Also according to the present disclosure, a method of measuring a layered object, such as an eye, is further provided comprising providing an interferometer including a reference arm comprising a first section of polarization maintaining optical fiber engaged with a first fiber stretcher, and a measurement arm comprising a second section of polarization maintaining optical fiber engaged with a second fiber stretcher; propagating low coherence light of a first polarization through a polarization maintaining fiber coupler and into the reference arm and measurement arm of the interferometer; while propagating coherent light of a second polarization through the polarization maintaining fiber coupler and into the reference arm and measurement arm of the interferometer; splitting the low coherence light of the first polarization from the coherent light of a second polarization in the measurement arm, reflecting the low coherence light of the first polarization off at least one surface of the layered object back through the measurement arm while reflecting the coherent light of the second polarization back through the measurement arm; reflecting the co-propagated low coherence light of the first polarization and coherent light of a second polarization back through the reference arm; driving the first and second fiber stretchers so as to alternatingly vary the lengths of the first section of polarization maintaining optical fiber and the second section of polarization maintaining optical fiber, thereby causing an interference signal with the low coherence light when the length of the reference arm is equal to the length of the measurement arm including the distance from the second section of polarization maintaining optical fiber to the at least one surface of the layered object; detecting the interference signal; and detecting a signal from the back reflected coherent light of the second polarization that is indicative of the length of the measurement arm including the distance from the second section of polarization maintaining optical fiber to the at least one surface of the layered object.

The layered object may be comprised of a first surface and a second surface. In such an instance, the method includes causing a first interference signal with the low coherence light when the length of the reference arm is equal to the length of the measurement arm including the distance from the second section of polarization maintaining optical fiber to the first surface of the layered object, and causing a second interference signal with the low coherence light when the length of the reference arm is equal to the length of the measurement arm including the distance from the second section of polarization maintaining optical fiber to the second surface of the layered object.

The first and second interference signals are detected, and may be further analyzed, stored, used in controlling another process, converted to numerical values, used in computations, and/or displayed on a computer screen. The method may further include using the signal from the back reflected coherent light of the second polarization as a reference waveform in a lock-in algorithm to reject noise in the interference signal, or using the signal from the back reflected coherent light of the second polarization to linearize motion of the first and second fiber stretchers.

The layered object may be comprised of more than two surfaces, in which case, interference signals may be produced and detected that are representative of each of the surfaces. In order to detect all of the surfaces of an object, the variation in the length of the first section of polarization maintaining optical fiber, and hence the variation in the length of the measurement arm is greater than the total thickness of the object.

BRIEF DESCRIPTION OF THE DRAWINGS

The present disclosure will be provided with reference to the following drawings, in which like numerals refer to like elements, and in which:

FIG. 2 is a detailed schematic illustration of a human eye;

FIG. 3 is a portion of an exemplary interferogram of an eye when measured by the apparatus substantially the same as that depicted in FIG. 1.

Figure 1:
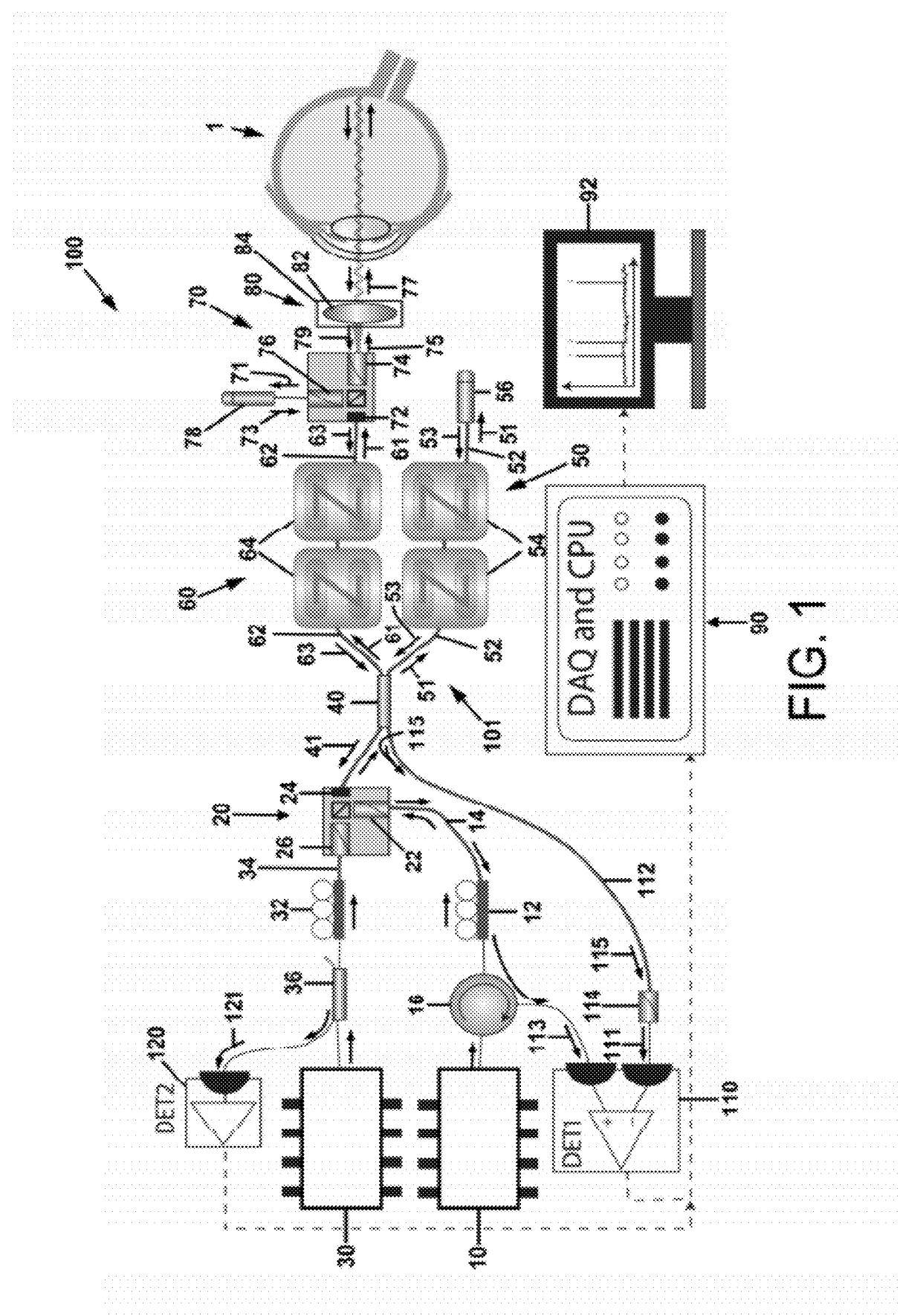
FIG. 1 is a schematic illustration of the applicants' measurement apparatus.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. In the following disclosure, the present invention is described in the context of its use as an apparatus to measure the axial length of a human eye, with related methods of using the apparatus also disclosed. However, it is not to be construed as being limited only to use in eye measurements. The invention is adaptable to any use in which measurement of a layered object or a portion thereof is desired, particularly with regard to layer thicknesses. Additionally, the description may identify certain components with the adjectives such as "top," "upper," "bottom," "lower," "left," "right," etc. These adjectives are provided in the context of use of the apparatus as an eye measurement device, and in the context of the orientation of the drawings, which is arbitrary. The description is not to be construed as limiting the apparatus to use in a particular spatial orientation. The instant measurement apparatus may be used in orientations other than those shown and described herein.

FIG. 1 is a schematic illustration of the applicant's measurement apparatus. The apparatus 100 is comprised of a low coherence light source 10, a coherent light source 30, and an interferometer 101 including a reference arm 50 and a measurement arm 60. The reference arm 50 is comprised of a first section 52 of polarization maintaining optical fiber engaged with a first fiber stretcher 54 and terminating proximate to a first mirror 56. The measurement arm 60 is comprised of a second section 62 of polarization maintaining optical fiber engaged with a second fiber stretcher 64 and terminating at a first port 72 of a first polarization selective light splitter and combiner (PSLSC) 70. The first PSLSC 70 is configured to direct light of a first polarization through a second port 74 thereof to the layered object such as an eye 1, and to direct light of a second polarization through a third port 76 to a second mirror 78. One PSLSC that is suitable for use in the apparatus 100 is a Model PFC-830-P/P/P, manufactured and sold by Thorlabs, Inc. of Newton, N.J.

The low coherence light source 10 emits low coherence light through a first polarization controller 12, through a section 14 of polarization maintaining optical fiber, into a first port 22 and out of a second port 24 of a second polarization selective light splitter and combiner 20, through a polarization maintaining fiber coupler 40 and into the first and second sections 52 and 62 of polarization maintaining optical fiber. The coherent light source 30 emits coherent light through a second polarization controller 32, through a section 34 of polarization maintaining optical fiber, into a third port 26 and out of the second port 24 of the second PSLSC, through the polarization maintaining fiber coupler 40 and into the first and second sections 52 and 62 of polarization maintaining optical fiber.

The first polarization controller 12 polarizes the low coherence light with a first polarization, and the second polarization controller 32 polarizes the coherent light with a second polarization orthogonal to the first polarization. The low coherence light of the first polarization and the coherent light of the second polarization co-propagate through the reference arm 50 of the interferometer 101 as indicated by arrows 51, and are reflected by the first mirror 56 through the reference arm 50 back to the polarization maintaining fiber coupler 40 as indicated by arrows 53.

The low coherence light of the first polarization and the coherent light of the second polarization co-propagate through the measurement arm 60 of the interferometer 101 as indicated by arrows 61. Within the first PSLSC 70, the coherent light of the second polarization is split from the low coherence light of the first polarization, and exits the PSLSC 70 through the third port 76 as indicated by arrow 71. This split coherent light reflects off the second mirror 78 as indicated by arrow 73, re-enters the third port 76 of the first PSLSC 70, and returns through the measurement arm back to the polarization maintaining fiber coupler 40 as indicated by arrows 63.

The low coherence light of the first polarization exits the PSLSC 70 through the second port 74 as indicated by arrow 75. In the measurement of the eye 1 (or other layered object), the low coherence light of the first polarization propagates to the eye 1 as indicated by arrow 77. This light is reflected off the various surfaces 2, 4, 6, 8, and 9 of the eye 1 (see also FIG. 2) as indicated by arrow 79. The reflected low coherence light of the first polarization re-enters the second port 74 of the first PSLSC 70, and returns through the measurement arm 60 back to the polarization maintaining fiber coupler 40 as indicated by arrows 63.

Back reflected low coherence light of the first polarization is propagated from the polarization maintaining fiber coupler 40 to a first detector 110 as indicated by arrow 111, and reflected coherent light of the second polarization is propagated from the polarization maintaining fiber coupler 40 to a second detector 120 as indicated by arrow 121. Various optical configurations may be used to achieve this result. In the embodiment depicted in FIG. 1, the apparatus 100 is comprised of a first optical coupler 16 disposed between the low coherence light source 10 and the first polarization controller 12, and a second optical coupler 36 disposed between the coherent light source 30 and the second polarization controller 32. In such a configuration, back reflected low coherence light of the first polarization passes into the second port 24 of the second PSLSC 20 as indicated by arrow 41, and out of the first port 22 of the second PSLSC 20, and through the first optical coupler 16 to the first detector 110 as indicated by arrow 113.

Additionally, back reflected coherent light of the second polarization passes into the second port 24 of the second PSLSC 20 as indicated by arrow 41, and out of the third port 26 of the second PSLSC 20, and through the second optical coupler 36 to the second detector 120. The first optical coupler 16 may be an optical circulator. The apparatus 100 may further include a section 112 of polarization maintaining optical fiber disposed between the polarization maintaining fiber coupler 40 and the first detector 110, so that the back reflected low coherence light of the first polarization and back reflected coherent light of the second polarization may be propagated therethrough as indicated by arrows 113. An in-line polarizer 114 may be disposed between the section 112 of polarization maintaining optical fiber and the first detector 110, which blocks back reflected coherent light of the second polarization from entering the first detector 110. Thus the interferometric signal 111 to the low coherence light detector 110 does not contain coherent light interferometric signal, and the interferometric signal 121 to the coherent light detector 120 does not contain low coherence light interferometric signal. In cases in which the wavelength of the coherent source 30 is different from the central wavelength of the low-coherence source 10, the PSLSCs 20 and 70 can be replaced by wavelength combiners (wave-division multiplexers) (not shown). In addition, the PM coupler 40 can be replaced by a non-PM coupler (not shown), and the polarization controllers 12 and 32 moved to locations immediately after the non-PM coupler, and immediately adjacent to the fiber stretchers 54 and 64.

The first detector 110 may be a balanced detector, which subtracts the signals received by each of its two input signals indicated by arrows 111 and 113 from each other. In that manner, the common-mode noise associated with the fluctuations in the output power of the low coherence light source 10 is removed. This configuration also doubles the amplitude of the signal due to the out-of-phase interference between the sample light and the reference light traveling in each of the output paths 41 and 115 of the coupler 40.

The apparatus 100 may further include an optical probe 80 comprising a lens 82 within a housing 84. The optical probe 80 is in optical communication with the third port 74 of the first PSLSC 70, and serves to focus and direct the low coherence light of the first polarization into the eye 1. By "optical communication," it is meant that the optical probe 80 receives light from and returns light back to the third port 74 of the first PSLSC 70. The optical probe 80 may be attached directly to the first PSLSC 70, or it may be in communication through optical fiber or another light guide, or it may be in communication through air or another gas or a liquid or other light transmissive medium.

The first and second fiber stretchers 54 and 64 are driven so as to alternatingly vary the lengths of the first section 52 of polarization maintaining optical fiber and the second section 62 of polarization maintaining optical fiber, thereby causing interference signals with the low coherence light when the length of the reference arm 50 is equal to the length of the measurement arm 60 including the distance from the second section 62 of polarization maintaining optical fiber to any of the surfaces of the layers of the eye 1 or other object. The interference signals are detected by the first detector 110. Additionally, a signal from the back reflected co-propagated coherent light of the second polarization that is indicative of the length of the measurement arm 60 including the distance from the second section 62 of polarization maintaining optical fiber to at least one surface of the eye 1 is also detected.

In operation of the apparatus 100, the first and second fiber stretchers 54 and 64 are driven so as to alternatingly vary the lengths of the first section 52 and the second section 62 of polarization maintaining optical fiber, by alternatingly stretching them, and then permitting them to relax. In effect, this action varies the respective lengths of the reference arm 50 and the measurement arm 60 of the interferometer 101. At any point in time when the length of the reference arm 50 is equal to the length of the measurement arm 60, which includes the distance from the first section 62 of polarization maintaining optical fiber to any of the surfaces 2, 4, 6, 8, and 9 of the eye 1, an interference signal is produced. The resulting interference signals are detected by the first detector 110. The apparatus 100 may further include a computer 90 in signal communication with the first detector 110. The interference signals may be received by a data acquisition system in the computer 90, and further analyzed, stored, used in controlling another process, converted to numerical values, used in computations, and/or displayed on a computer screen 92.

FIG. 2 is a detailed schematic illustration of a human eye 1. The eye 1 is comprised of a cornea 3 having a front surface 2 and a rear surface 4, a lens 5 having a front surface 6 and a rear surface 8, and a retina 7 having a front surface 9. In operation of the apparatus 100, as described previously for the measurement of an eye 1, the low coherence light of the first polarization propagates to the eye as indicated by arrow 77. This light is reflected off the various surfaces 2, 4, 6, 8, and 9 of the eye 1 and is returned to the first PSLSC 70 as indicated by arrow 79 and continues on through the measurement arm 60 of the interferometer 101.

FIG. 3 is an interferogram 200 of an eye 1 as measured by the apparatus 100. The resulting interference signals resulting from reflections off of the surfaces 2, 4, 6, 8, and 9 are detected by the first detector 110 and displayed in interferogram 200. Relating FIG. 3 to FIG. 2, it can be seen that peak 202 corresponds to front corneal surface 2, peak 204 corresponds to rear corneal surface 4, peak 206 corresponds to front lens surface 6, peak 208 corresponds to rear lens surface 8, and peak 209 corresponds to the front retinal surface 9.

To obtain the actual thicknesses of the tissues/materials between these surfaces, a signal from the back reflected coherent light of the second polarization is also detected by the second detector 120. The corresponding interferometric signal from the detector 120 essentially encodes the information about the magnitude of the fiber stretching. One period in the coherent light signal oscillations corresponds to an optical path length change of one half of the coherent light wavelength. By counting the number of periods between the low-coherence interferometric peaks, the exact optical distance between the corresponding surfaces inside the layered object can be calculated. The signal 121 is used by the computer 90 to calculate the length of the measurement arm 60 including the optical distance from the second section of polarization maintaining optical fiber to at least one surface of the eye 1. The optical thicknesses between the respective peaks 202 et seq. can then be determined, i.e. the corneal thickness 203, the anterior chamber depth 201, the lens thickness 205, the vitreous humor thickness 207, and the total axial eye length 209. With knowledge of the refractive indices of each of these tissues/materials, the actual thicknesses of them can be calculated. These thickness values can then be used in various non-invasive and surgical ophthalmologic procedures and therapies.

The first and second fiber stretchers may be piezoelectrically driven fiber stretchers, or other electromechanical or mechanically operated fiber stretchers, such as those disclosed in commonly owned U.S. Pat. No. 7,206,076 of Blalock, the disclosure of which is incorporated herein by reference. Alternatively, the first and second fiber stretchers may be linear actuator-driven fiber stretchers, such as those disclosed in U.S. Pat. No. 7,382,962 of Yao, the disclosure of which is incorporated herein by reference. The fiber stretchers may be PFM-50C piezoelectric fiber modulators manufactured and sold by New Scale Technologies of Victor N.Y., or they may be fiber stretchers as supplied with the OPTI-GAGE™ instrument, which is manufactured and sold by Lumetrics. Inc. of West Henrietta N.Y. The use of piezoelectrically driven fiber stretchers is effective because they have a high speed of the modulation, i.e., the frequency of oscillations of the voltage that drives the piezo stretchers can reach hundreds of Hertz. Thus one complete cycle of modulation, i.e. one cycle for measurement of the eye 1 can be performed on a time scale of a few milliseconds, which is faster than the typical rate of eye jitter in a patient.

The first fiber stretcher 54 may be operated substantially 180 degrees out of phase with the second fiber stretcher 64. The fiber stretchers 54 and 64 may be driven with a voltage having the shape of a saw tooth, or any other shape (e.g., square, sinusoidal, nonlinear) necessary to achieve accurate measurements. The fiber stretchers 50 and 60 are provided with a stretching amplitude and sufficient respective lengths of fiber engaged with them so that the variation in the respective lengths of the arms 50 and 60 of the interferometer 101 are greater than the total thickness of the eye 1. In that manner, all of the surfaces of the eye 1 result in interference peaks in the interferogram 200, and complete geometrical information of the eye 1 is obtained.

The low coherence light source 10 may be a super luminescent light emitting diode (SLED). The coherent light source 30 may be a laser. The wavelength of the laser 30 may be substantially equal to the central wavelength of the SLED 10. In one embodiment directed to measurement of an eye, these wavelengths may both be about 830 nanometers (nm). This wavelength is preferred in eye measurement because the various tissues/materials of the eye all transmit the light of the SLED that is centered around 830 nm. The absorption of the vitreous humor increases for wavelengths above 900 nm. If a light source of greater than 900 nm is used, such stronger light absorption results in the reduced strength of the interferometric signals and therefore reduced sensitivity of the apparatus 100. Typically, to avoid patient discomfort caused by the bright measurement light, the invisible near-infrared wavelengths (750-900 nm) are preferred in the apparatus 100, rather than visible wavelengths of less than 750 nm.

The use of polarization components enables the selection of a laser having a wavelength of about 830 nm. The use of polarization controllers 12 and 32 to orthogonally polarize the SLED light and the laser light, and the use of polarization maintaining fiber and splitters/combiners enable the SLED light and the laser light to be separated from each other to prevent the laser from damaging the eye 1, while having both propagate though the arms 50 and 60 of the interferometer 101 to perform their respective functions. Using orthogonally polarized SLED light and laser light, both centered at the same wavelength enables an increase in the measurement accuracy by eliminating the effects of dispersion (wavelength-dependence of the fiber components).

With regard to data acquisition and analysis, the signals from both detectors 110 and 120 may be digitized and processed using algorithms stored on and executed by the computer 90 or other computing electronic circuit. One suitable algorithm uses a tracking lock-in detection approach, wherein the laser signal 121 is used to generate a waveform with its instant frequency equal to the instant frequency of the low-coherence interferometric oscillations. The generated waveform can then be used as a reference waveform in the lock-in detection, which acts as a very narrow band pass filter, thus rejecting the noise and improving signal-to-noise ratio (SNR). The advantage of such approach over other methods, e.g. band-pass filtering, is in its ability to follow the changing frequency of oscillations in a nonlinear modulating system, such as piezo stretchers. The tracking lock-in approach is simplified in the current polarization maintaining (PM) configuration, as the frequency of the laser signal is immediately equal to the fringe frequency of the low-coherence signal, since the wavelength of the laser 30 is equal to the central wavelength of the SLED 10. Thus, the laser signal can be directly used as a reference waveform in the lock-in algorithm as shown in FIG. 4, which is a schematic diagram and related graphs of the tracking lock-in detection algorithm.

Figure 4:
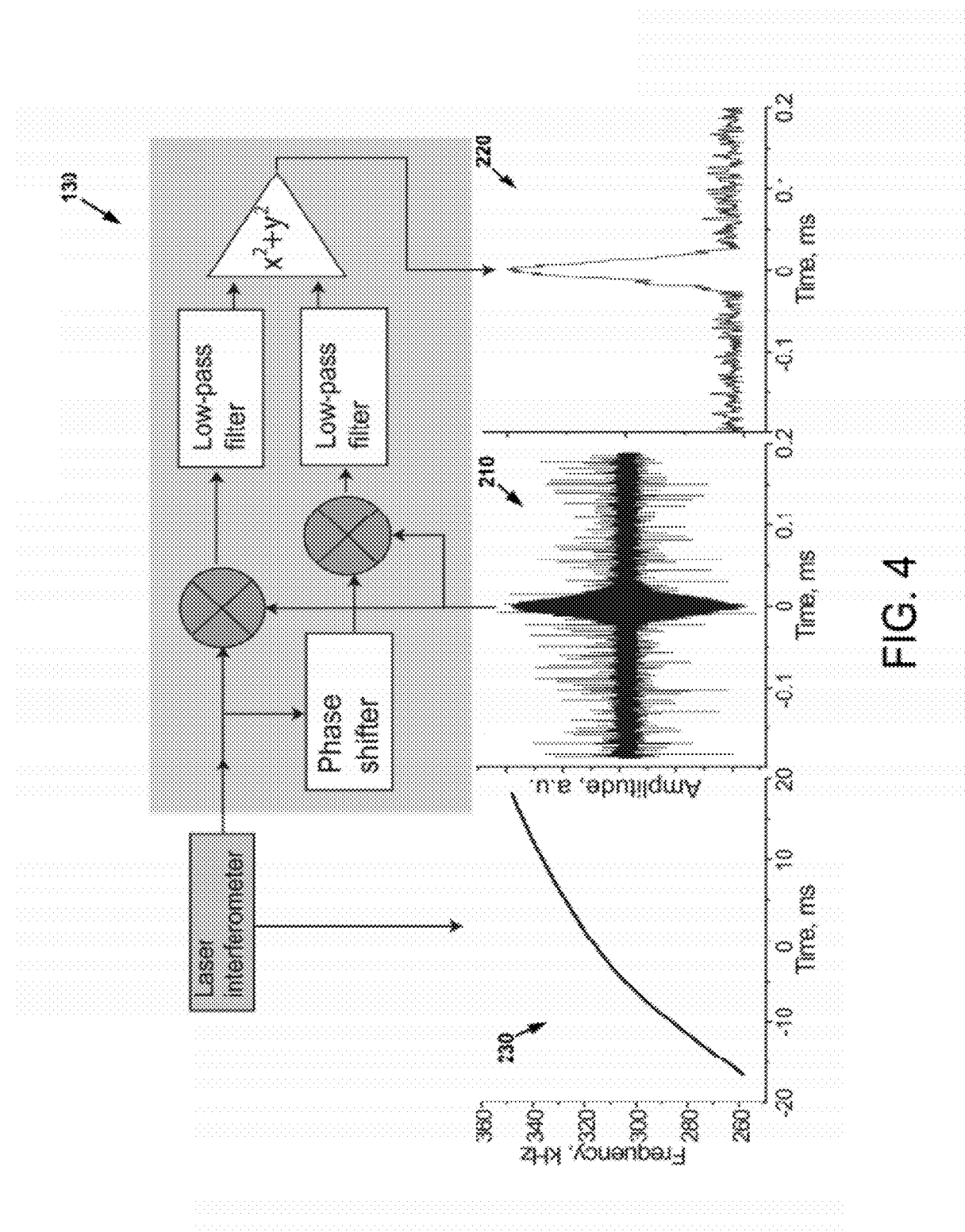
FIG. 4 is a schematic diagram and related graphs of a tracking lock-in detection algorithm for acquiring and analyzing interferometric data from the measurement apparatus.

Referring to FIG. 4, the interferometric signal of the laser 30 is used as a reference waveform in the lock-in amplifier 130. The low-coherence interferogram 210 is multiplied with the laser signal and the resulting data is subject to a low-pass filter. The output 220 of the lock-in amplifier shows the demodulated low-coherence peak with an improved SNR. Graph 230 shows the instant frequency of the laser signal during the fiber stretching. The frequency may change due to the nonlinear dynamics of the piezo-modulated fiber stretcher. This algorithm follows the laser frequency change, and thus keeps the SNR improvement constant throughout the scan of the eye 1 or other layered object.

As an alternative to the tracking lock-in detection algorithm, the laser signal may be used to calibrate the stretching dynamics of the piezo modulators 54 and 64. Typically, a triangular-shaped voltage is applied to the piezo stretchers 54 and 64, but the linear time dependence of the driving voltage results in a nonlinear response from the piezo-stretchers 54 and 64. However, such nonlinear behavior can be compensated by applying a nonlinear driving voltage. This can be done by the initial calibration of the piezo driving voltage using information about the stretching dynamics from the laser interferometric oscillations. If the linearity of the modulation is well preserved in time, the co-propagating light from laser 30 inside the interferometer 101 is no longer needed to calculate the distance between the low-coherence interferometric peaks. Alternatively, if the linearity is not preserved over time, the laser signal can be used to continuously adjust the slope of the driving voltage in a feed-back loop to maintain the constant frequency of the laser oscillations, and therefore maintain the linearity of the stretch. Once the linear dynamics of the piezo modulators 54 and 64 are defined, a simple band-pass filtering may then be used to extract the low-coherence interferometric signal from noise as an alternative to using the lock-in algorithm.

It is, therefore, apparent that there has been provided, in accordance with the present invention, a apparatus and method for apparatus for measuring a layered object, such as an eye. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

We claim:

1. An apparatus for measuring a layered object, the apparatus comprising:
   a) a reference arm of an interferometer, the reference arm comprising a first section of polarization maintaining optical fiber engaged with a first fiber stretcher and terminating proximate to a first mirror;
   b) a measurement arm of the interferometer, the measurement arm comprising a second section of polarization maintaining optical fiber engaged with a second fiber stretcher and terminating at a first port of a first polarization selective light splitter and combiner configured to direct light of a first polarization through a second port to the layered object, and to direct light of a second polarization through a third port to a second mirror;
   c) a low coherence light source emitting low coherence light through a first polarization controller, into a first port and out of a second port of a second polarization selective light splitter and combiner, through a polarization maintaining fiber coupler and into the first and second sections of polarization maintaining optical fiber; and
   d) a coherent light source emitting coherent light through a second polarization controller, into a third port and out of the second port of the second polarization selective light splitter and combiner, through the polarization maintaining fiber coupler and into the first and second sections of polarization maintaining optical fiber;

wherein the first polarization controller polarizes the low coherence light with the first polarization, and the second polarization controller polarizes the coherent light with the second polarization orthogonal to the first polarization;

and wherein the low coherence light of the first polarization and the coherent light of the second polarization co-propagate through the reference arm of the interferometer and are reflected by the first mirror through the reference arm back to the polarization maintaining fiber coupler;

and wherein the low coherence light of the first polarization and the coherent light of the second polarization co-propagate through the measurement arm of the interferometer, the coherent light of the second polarization is split from the low coherence light of the first polarization and reflects off the second mirror through the measurement arm back to the polarization maintaining fiber coupler, and the low coherence light of the first polarization is reflectable off the layered object through the measurement arm back to the polarization maintaining fiber coupler;

and wherein back reflected low coherence light of the first polarization is propagated from the polarization maintaining fiber coupler to a first detector, and reflected coherent light of the second polarization is propagated from the polarization maintaining fiber coupler to a second detector.

2. The apparatus of claim 1, further comprising an optical probe in optical communication with the third port of the first polarization selective light splitter and combiner.

3. The apparatus of claim 1, further comprising a third section of polarization maintaining optical fiber disposed between the polarization maintaining fiber coupler and the first detector, wherein back reflected low coherence light of the first polarization and back reflected coherent light of the second polarization are propagated through the third section of polarization maintaining optical fiber.

4. The apparatus of claim 3, further comprising an in-line polarizer disposed between the third section of polarization maintaining optical fiber and the first detector, which blocks back reflected coherent light of the second polarization from entering the first detector.

5. The apparatus of claim 1, further comprising a first optical coupler disposed between the low coherence light source and the first polarization controller, and a second optical coupler disposed between the coherent light source and the second polarization controller, wherein back reflected low coherence light of the first polarization passes into the second port and out of the first port of the second polarization selective light splitter and combiner, and through the first optical coupler to the first detector; and back reflected coherent light of the second polarization passes into the second port and out of the third port of the second polarization selective light splitter and combiner, and through the second optical coupler to the second detector.

6. The apparatus of claim 5, wherein the first optical coupler is an optical circulator.

7. The apparatus of claim 1, wherein the low coherence light source is a super luminescent light emitting diode, and the coherent light source is a laser.

8. The apparatus of claim 7, wherein the wavelength of the laser is substantially equal to the central wavelength of the super luminescent light emitting diode.

9. The apparatus of claim 8, wherein the wavelength of the laser is about 830 nanometers.

10. The apparatus of claim 1, wherein the first and second fiber stretchers alternatingly stretch and relax the first and second sections of polarization maintaining optical fiber.

11. The apparatus of claim 10, wherein the first fiber stretcher is operated substantially 180 degrees out of phase with the second fiber stretcher.

12. The apparatus of claim 10, wherein the first and second fiber stretchers are piezoelectrically driven fiber stretchers.

13. A method for measuring a layered object comprising:
a) providing an interferometer including a reference arm comprising a first section of polarization maintaining optical fiber engaged with a first fiber stretcher, and a measurement arm comprising a second section of polarization maintaining optical fiber engaged with a second fiber stretcher;
b) propagating low coherence light of a first polarization through a polarization maintaining fiber coupler and into the reference arm and measurement arm of the interferometer, while propagating coherent light of a second polarization through the polarization maintaining fiber coupler and into the reference arm and measurement arm of the interferometer;
c) splitting the low coherence light of the first polarization from the coherent light of a second polarization in the measurement arm, reflecting the low coherence light of the first polarization off at least one surface of the layered object back through the measurement arm while reflecting the coherent light of the second polarization back through the measurement arm;
d) reflecting the co-propagated low coherence light of the first polarization and coherent light of the second polarization back through the reference arm;
e) driving the first and second fiber stretchers so as to alternatingly vary the lengths of the first section of polarization maintaining optical fiber and the second section of polarization maintaining optical fiber, thereby causing an interference signal with the low coherence light when the length of the reference arm is equal to the length of the measurement arm including the distance from the second section of polarization maintaining optical fiber to the at least one surface of the layered object;
f) detecting the interference signal; and
g) detecting a signal from the back reflected coherent light of the second polarization that is indicative of the length of the measurement arm including the distance from the second section of polarization maintaining optical fiber to the at least one surface of the layered object.

14. The method of claim 13, wherein the layered object is comprised of a first surface and a second surface, and wherein the method includes causing a first interference signal with the low coherence light when the length of the reference arm is equal to the length of the measurement arm including the distance from the second section of polarization maintaining optical fiber to the first surface of the layered object, and causing a second interference signal with the low coherence light when the length of the reference arm is equal to the length of the measurement arm including the distance from the second section of polarization maintaining optical fiber to the second surface of the layered object; and detecting the first and second interference signals.

15. The method of claim 14, further comprising calculating the distance between the first and second surfaces of the layered object.

16. The method of claim 13, wherein the variation in the length of the first section of polarization maintaining optical fiber is greater than the thickness of the object.

17. The method of claim 13, wherein the layered object is an eye.

18. The method of claim 13, further comprising using the signal from the back reflected coherent light of the second polarization as a reference waveform in a lock-in algorithm to reject noise in the interference signal.

19. The method of claim 13, further comprising using the signal from the back reflected coherent light of the second polarization to linearize motion of the first and second fiber stretchers.

* * * * *